Sept. 29, 1964  H. F. KOSHOOT  3,151,042
BUBBLE-PLATE CHAMBER STEPPED STILL AND THE PROCESS FOR USING
SUCH A STILL FOR ALCOHOL OR PETROLEUM PURIFICATION
Filed July 17, 1958  5 Sheets-Sheet 1
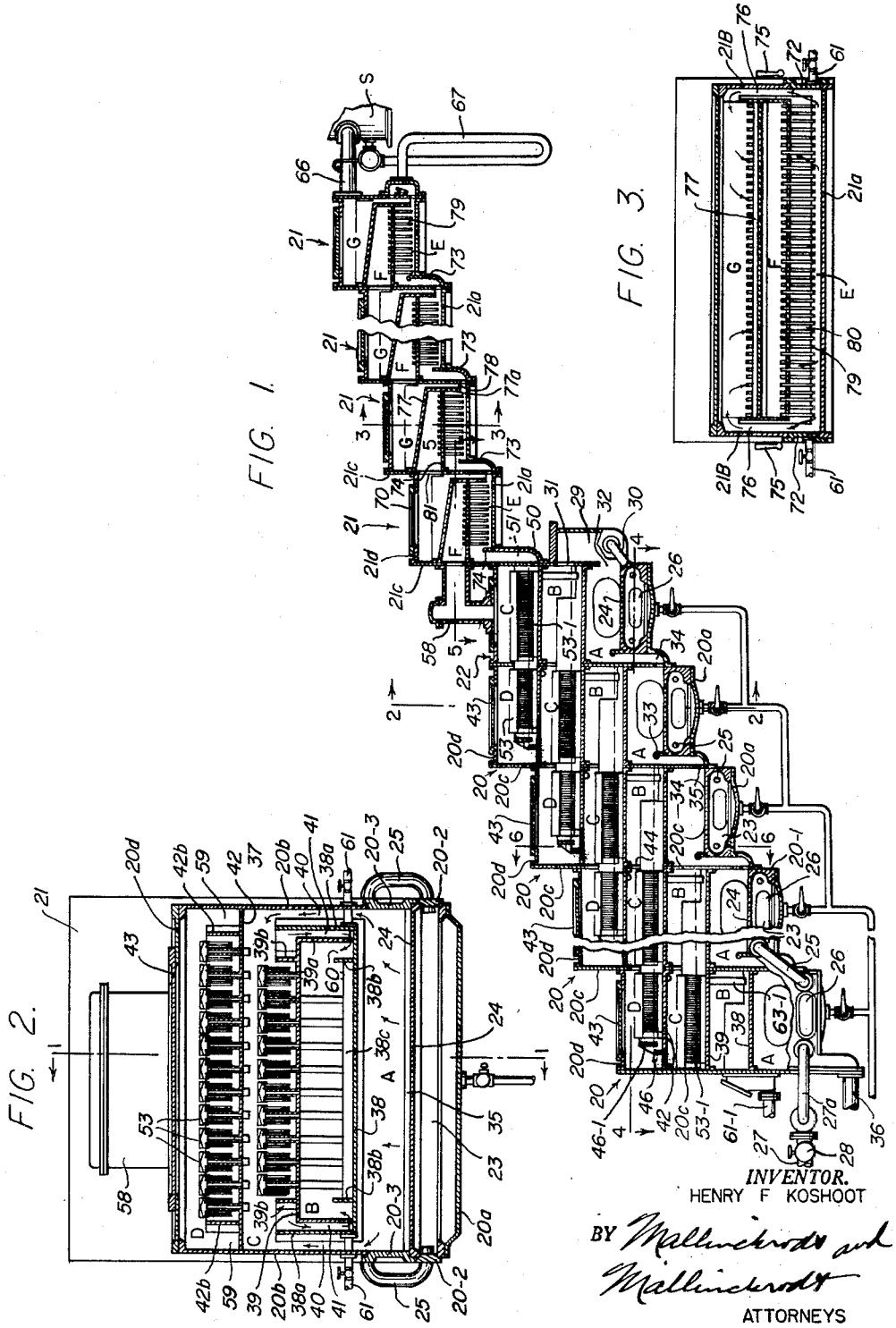
INVENTOR.
HENRY F KOSHOOT
BY Mallinckrodt and
Mallinckrodt
ATTORNEYS

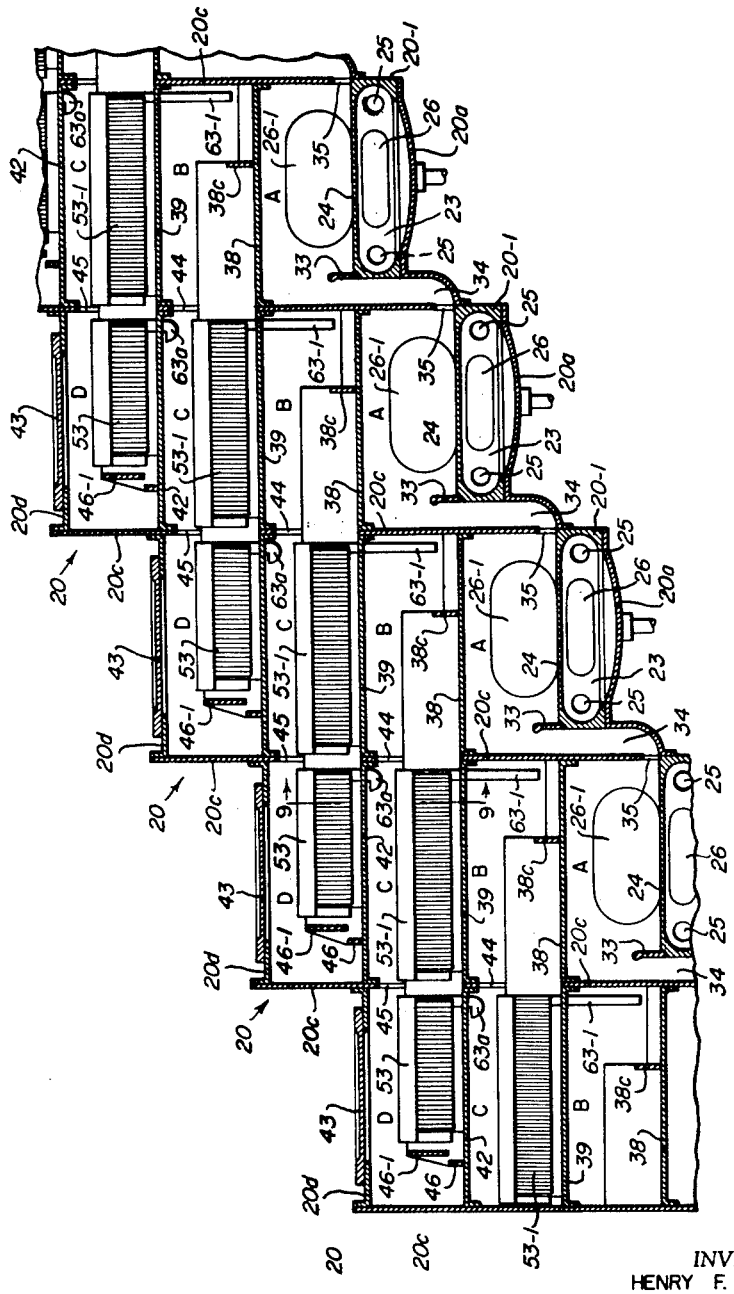

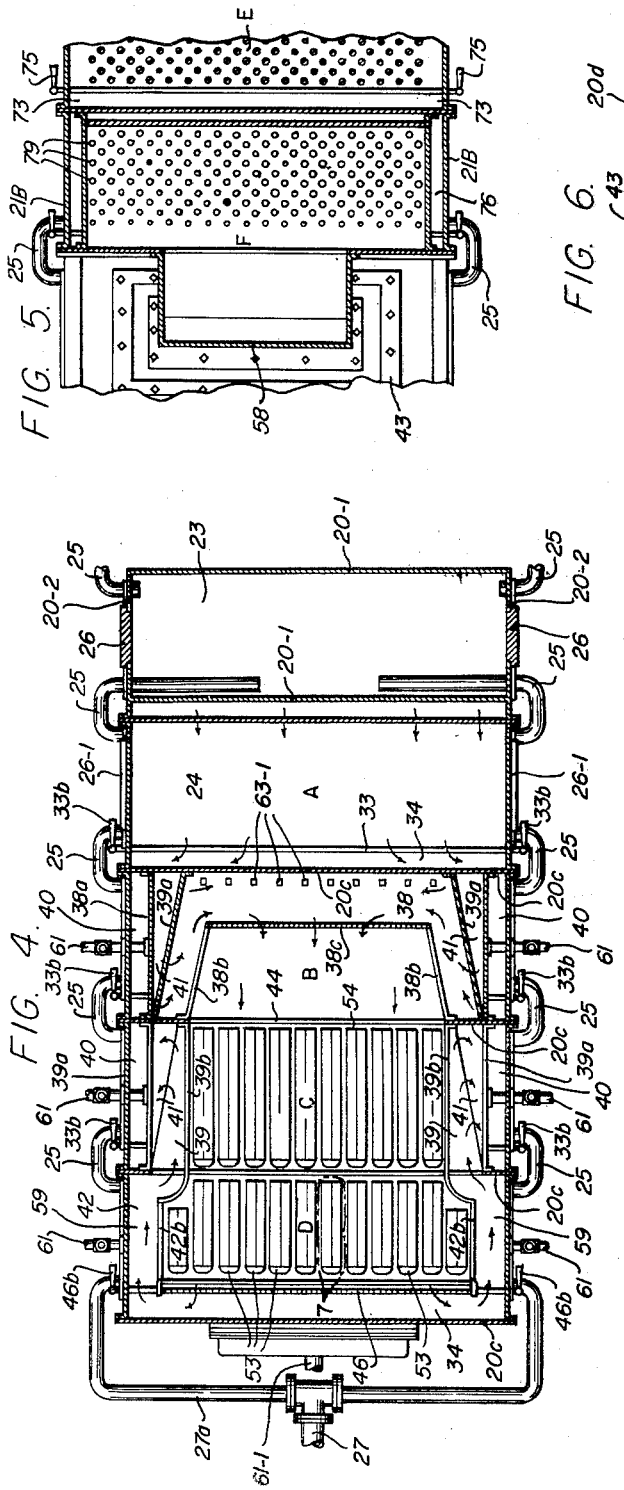
Sept. 29, 1964    H. F. KOSHOOT    3,151,042
BUBBLE-PLATE CHAMBER STEPPED STILL AND THE PROCESS FOR USING
SUCH A STILL FOR ALCOHOL OR PETROLEUM PURIFICATION
Filed July 17, 1958      5 Sheets-Sheet 3
*INVENTOR.*
HENRY F. KOSHOOT
BY
ATTORNEYS

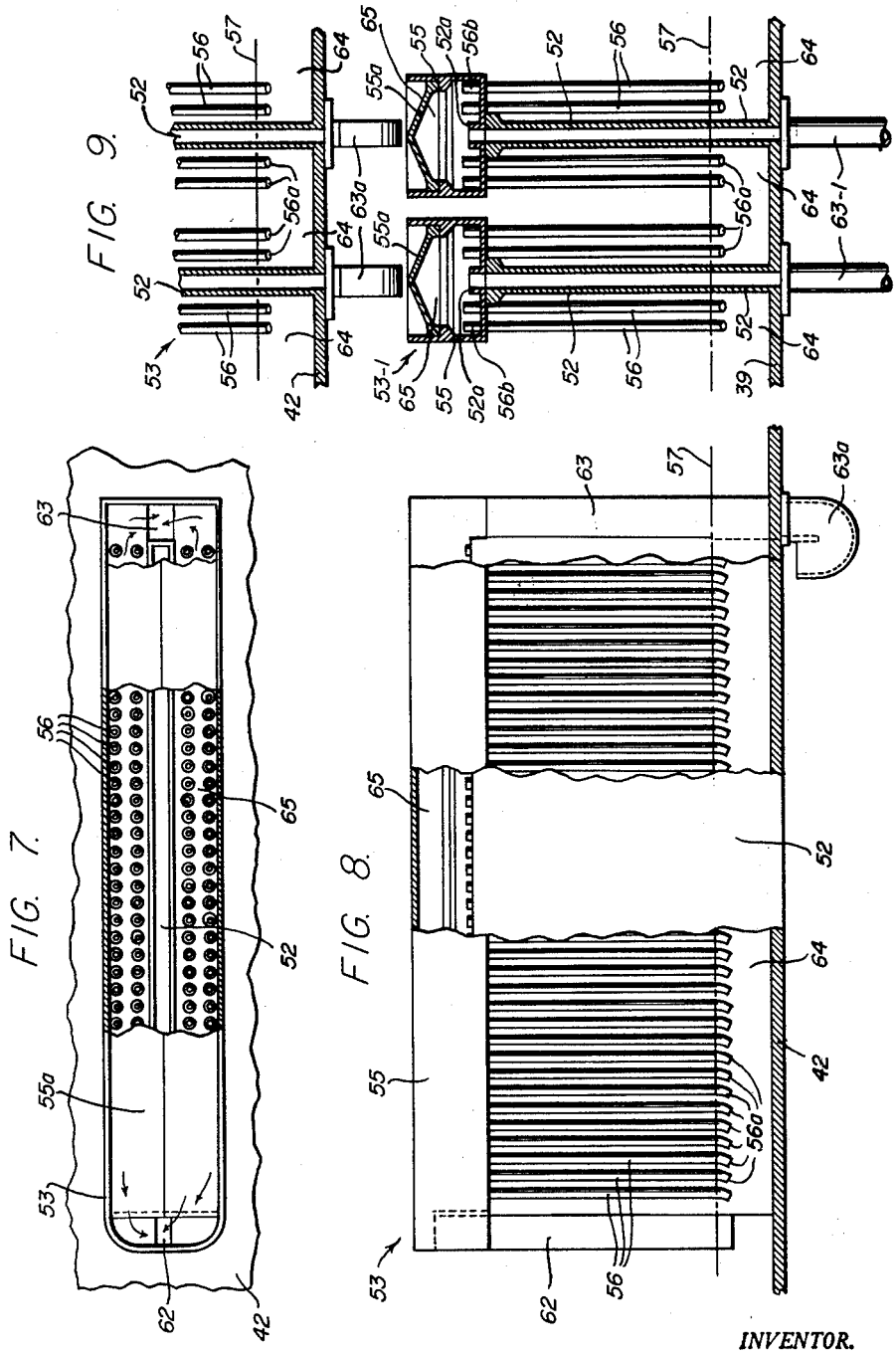

Sept. 29, 1964 H. F. KOSHOOT 3,151,042
BUBBLE-PLATE CHAMBER STEPPED STILL AND THE PROCESS FOR USING
SUCH A STILL FOR ALCOHOL OR PETROLEUM PURIFICATION
Filed July 17, 1958 5 Sheets-Sheet 5
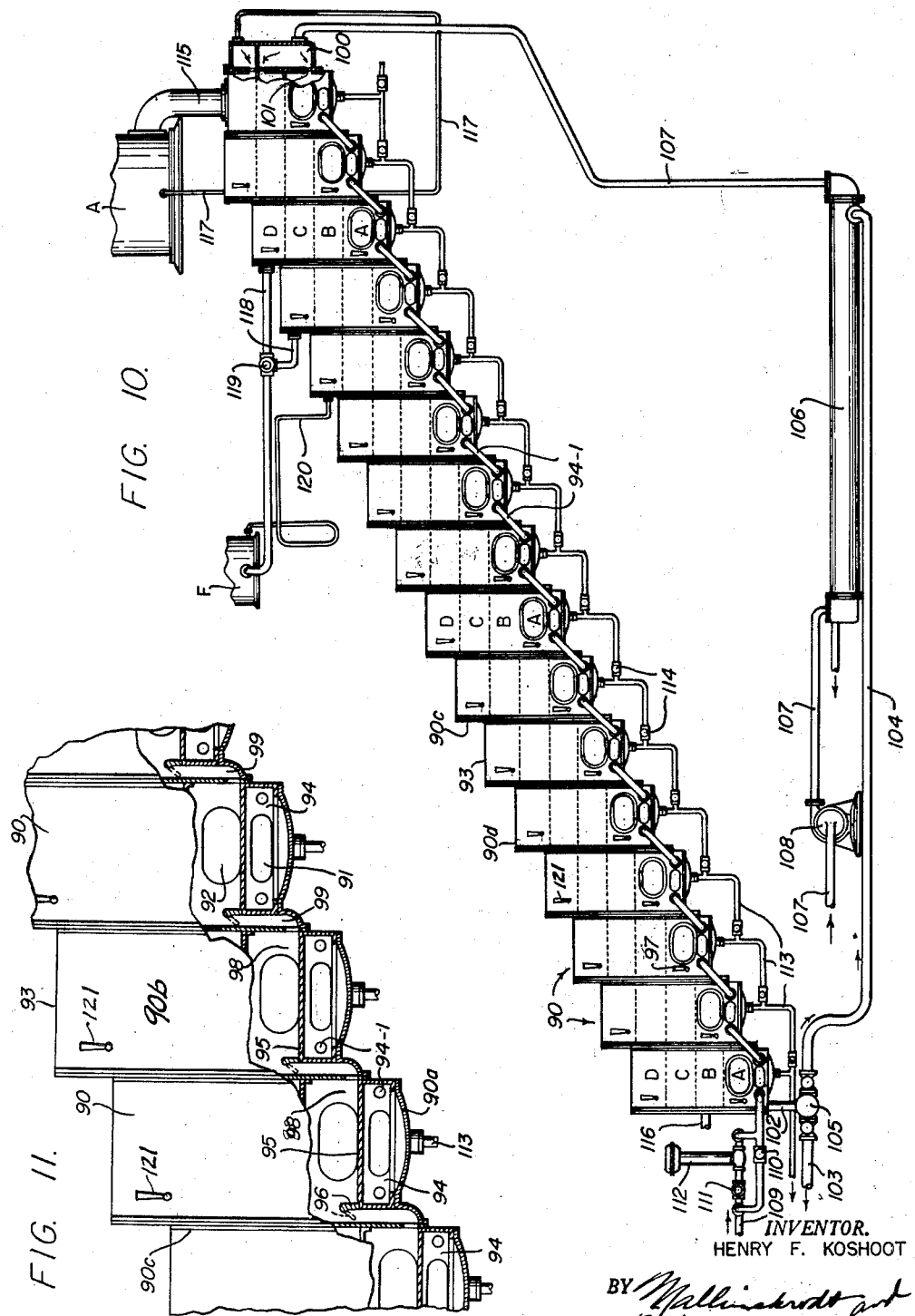
INVENTOR.
HENRY F. KOSHOOT
BY
ATTORNEYS

United States Patent Office 3,151,042
Patented Sept. 29, 1964

3,151,042
BUBBLE-PLATE CHAMBER STEPPED STILL AND THE PROCESS FOR USING SUCH A STILL FOR ALCOHOL OR PETROLEUM PURIFICATION
Henry F. Koshoot, 544 E. 1st S. St., Salt Lake City, Utah, assignor of forty percent to Trent J. Parker, Salt Lake City, Utah
Filed July 17, 1958, Ser. No. 749,279
29 Claims. (Cl. 202—40)

This invention relates to distillation processes and apparatus for the refining of various liquid and semi-liquid materials, such as petroleum and alcoholic solutions and mashes, and is particularly concerned with providing procedural and structural means whereby most of the disadvantages and difficulties encountered in conventional distillation practices utilizing customary types of apparatus are avoided.

The still of the invention may, for example, be a multiple-draw, fractionating type, useful for topping and fractionating petroleum crudes, or it may be type of generally similar construction useful for stripping and rectifying alcoholic liquids and mashes, chemical liquids, etc.

Distillation of petroleum is ordinarily carried out in fractionating towers, while distillation of alcohol is accomplished in mash or so-called "beer" columns and in rectifying columns. These towers and columns have many characteristics in common, and are built to considerable heights in order to provide a desirable ratio of fractionation or rectification space to evaporation area. Evaporation takes place from a series of vertically spaced, horizontal plates, each of which holds a shallow body of the liquid being distilled. The ascending vapors are forced to bubble through such liquid, thereby effecting heat interchange. These vapors become richer and richer in the more volatile components of the liquid, while losing their own less volatile components, which condense out as reflux condensates and flow downwardly from plate to plate countercurrent to rising vapors.

It is important for best results that there be enough vapor fractionation or rectification space between successive plates to properly handle the vapors given off from the superficial areas of the respective plates. This makes for tower or column height. The height of the tower or column is further increased by the need for spacing succesive plates far enough apart to avoid carry-over of entrained droplets of liquid in the rising vapors.

Tower or column height becomes a problem structurally, as well as operatively. For example, the foundation required is very costly and often difficult to construct. Height makes maintenance difficult, the difficulty increasing with increase in height.

One of the principal objects of the invention is to greatly reduce the height of distillation towers and columns by a construction which does not reduce, but actually increases, processing efficiency.

While excesive tower or column height creates difficulties in construction, maintenance, and operation, an even greater objection to conventional towers and columns lies in the fact that they are not particularly efficient in accomplishing the results sought, namely, separation of desired fractionation products. This is especially true with conventional fractionating towers, where it is necessary to employ expensive steam-stripping equipment as an adjunct to the tower itself.

Also, throughput capacity of conventional distillation apparatus is greatly limited by structural characteristics designed to effect as complete a separation between fractions as possible.

Another very important object of the invention is to step-up both the efficiency and the throughput rate in distillation practice, by utilizing an equilibrium condensation technique in unique and advantageous conjunction with continuous differential vaporization.

Additional objects are to still further increase the distillation throughput rate and the vapor-liquid interface area by novel structural characteristics of the still; to produce side-draw fractionation products or a rectification product of quality superior to that possessed by corresponding products of conventional stills, and this without the application of steam-stripping procedures and the corrosive and other difficulties acompanying the use of steam; to provide for vaporization by a particularly efficient heat transfer arrangement, and for bubbling of vapors through feed material and reflux condensate by particularly effective, economical, and trouble-free vapor-liquid contact devices; to greatly increase the evaporation area in a still, while restricting over-all size, and to adequately accommodate and handle the greater volume of vapors resulting from the increased evaporation area, thereby greatly increasing the productivity of the still; to produce sharper separations and greater purity of distillation products; to make the evaporation plates of the still self-cleaning and easily accessible for inspection and repair; to maintain the most desirable liquid gradients in the apparatus, largely by a unique way of bubbling the vapors through the liquid; and to provide for batch still characteristics in distillation apparatus operating on a continuous basis, so as to produce alcohol and alcoholic beverages of superior quality with considerably less difficulty and expense.

Principal features in the accomplishment of these objects are, from a general standpoint, certain unusual structural characteristics and arrangements of evaporation plates and of vapor-liquid interchange components to be described, and, in particular, the provision of a stepped series of distillation units including, in the case of petroleum distillation, a lower section made up of vaporization units for vaporizing and partially fractionating or rectifying a hot petroleum crude, and an upper section made up of fractionation or rectification units for treating vapors of lower boiling fractions as received from the lower section, and including, in the case of alcohol rectification, such vaporization units only.

The vaporization units are, in effect, individual distillation pots, each comprising a heat chamber for receiving a heating medium below and in intimate heat exchange contact with a vaporizing type of plate, upon which the liquid feed material to be distilled is heated and vaporized, and each further comprising a superimposed and corresponding series of fractionation or rectification chambers, plates, and bubble pipe devices, which receive reflux condensate and bubble the distillation vapors therethrough.

Especially important in the refining of petroleum in accordance with this invention, it is the provision for flowing hot, partially vaporized crude from a conventional pipe still or heater upwardly through the aforesaid heat chambers of the series of distillation units. Dephlegmation of the vapors in such feed crude is achieved by true equilibrium condensation reactions as the crude flows upwardly through the successive chambers, and, at the same time, such crude serves as a heating medium for the residual, which is cascaded down over the aforesaid evaporation or vaporizing plates of the units following flash vaporization of the feed crude at the top of the series.

Lower boiling fractions of the feed crude are vaporized and are separated from the residual at the top of the series of vaporization units by flash technique. They pass upwardly through the fractionation units of the upper section of distillation units. Higher boiling fractions, on the other hand, are successively vaporized and separated from the crude bottoms by continuous differential vaporization as the residual cascades downwardly and has its temperature gradually raised from the temperature of flash vaporization to the initial feed temperature of the crude.

In the rectifying of alcohol and other liquid chemicals, steam is passed through the heat chambers as a heating medium.

Further objects and features of the invention will becomes apparent from the following detailed description of the presently preferred specific embodiments illustrated by way of example in the accompanying drawings.

In the drawings:

FIG. 1 represents a longitudinal vertical section through a multiple-draw, fractionating still conforming to the invention and intended for the distillation of crude petroleum, the view being taken on the line 1—1 of FIG. 2 and intermediate portions (involving only additional structural units shown) being broken out, with the lower fragmentary portion of the still being raised in level for convenience of illustration and portions, including the fragmentary portion of the stabilizer at the upper end of the still, being shown in elevation;

FIG. 1A, an intermediate portion of FIG. 1 drawn to a considerably enlarged scale;

FIG. 2, a transverse vertical section taken on the line 2—2 of FIG. 1 and drawn to an enlarged scale;

FIG. 3, a similar view taken on the line 3—3 of FIG. 1;

FIG. 4, a horizontal section taken on the line 4—4 of FIG. 1, the view being drawn to the enlarged scale of FIGS. 2 and 3;

FIG. 5, a similar section, but corresponding to that indicated by the line 5—5 of FIG. 1;

FIG. 6, a transverse vertical section taken on the line 6—6 of FIG. 1 and drawn to the enlarged scale of FIGS. 2-5;

FIG. 7, a fragmentary top plan view, partly in horizontal section, corresponding to that portion of FIG. 4 encircled by the line 7, the view being drawn to a greatly enlarged scale and showing one of the several banks of bubble tubes in detail;

FIG. 8, a side elevation of the bank of bubble tubes shown in FIG. 7, an intermediate portion being shown in longitudinal axial section;

FIG. 9, a fragmentary, transverse, vertical section taken on the line 9—9 of FIG. 8, with the addition of the lower bank of bubbles tubes indicated by the bank of line 9—9 of FIG. 1;

FIG. 10, a view corresponding in general with that of FIG. 1, but taken with respect to a rectifying still designed for the distillation of alcohol and being entirely in elevation;

FIG. 11, a fragmentary, intermediate portion of the still of FIG. 9 drawn to an enlarged scale, the lower portion thereof being shown in longitudinal, central section.

Referring to the drawings:

PETROLEUM TOPPING AND SEPARATION

The multiple-draw, fractionating still of FIGS. 1-9 is typical of the application of this invention to the topping and fractionation of crude petroleum. It serves as the principal unit of a topping and separation plant, which also includes a stabilizer (shown only fragmentarily at S) for treating light gasoline vapors and other very low-boiling gaseous materials produced by the still. The stabilizer is preferably of a novel type, whose construction and operation will be fully detailed in a separate application for patent to be filed by me. It replaces the complicated stabilizing systems customarily used.

In contrast to conventional, multi-draw, fractionating towers, which are necessarily erected vertically to great heights, the still of the invention is constructed as a structurally and functionally integrated series of distillation units arranged in successively contiguous, step formation, along a gradual slope.

In the form illustrated, there are a suitable number of mutually identical, vaporization units 20, arranged in successively contiguous and integral (one with another), step formation (front to back with the next forward and next rearward units), to provide a topping section for the apparatus. These are succeeded by a suitable number of mutually identical, fractionation units 21, which are also arranged in successively contiguous, step formation to provide a separation section for the apparatus. A transition unit 22 is interposed between these two sections.

The first section operates as combined vaporizing and fractionating means, while the second section operates solely as fractionating means to continue the fractionating function of the first section on the lower boiling components, e.g., light gasoline and naphtha vapors. The number and size of the units 20 and 21 in the respective sections will depend upon the desired throughput rate for the still, the composition of the particular crude to be distilled, and the degree of fractionation desired. There will ordinarily be from about fourteen to about twenty of the units 20, while the number of units 21 will ordinarily vary from three to six.

Vaporization of the Crude

Each of the vaporization units 20 and the transition unit 22, which is itself a vaporization unit, includes fluid-containing structure defining a closed heat chamber 23, FIGS. 1, 1A, 2, 4, and 6. Such structure includes a top plate 24 of some suitable heat-conductive material, which serves as an evaporation or vaporizing plate, and a bottom plate 20a which serves as the bottom wall of the unit and is advantageously removably secured, as by bolting (not shown), to chamber end walls 20-1 and to chamber side walls 20-2.

The heat chambers 23 are well insulated in suitable manner (not shown) against loss of heat, and are connected in fluid-flow communication with one another by pipes 25 at mutually opposite sides thereof. They are advantageously provided with respective manholes covered by clean-out doors 26.

Hot feed crude, usually at a temperature of from 570 to 600 degrees Fahrenheit, is supplied from a conventional pipe still or heater (not shown) to heat chamber 23 of the lowermost unit 20 through supply pipe 27 and header 27a FIGS. 1 and 4, under control of a valve 28, FIG. 1.

The feed crude is heated in a conventional pipe-still or heater (not shown), and the vapors formed during the heating are kept in intimate contact with such crude until the desired temperature is reached (i.e., heating under equilibrium condensation conditions).

The hot and partially vaporized crude is admitted into heat chamber 23 of the lowermost unit 20, from which it flows upwardly through the heat chamber of each unit 20 and transition unit 22 in succession. During this travel, the mixed vapors are fractionated by successive, partial condensation under equilibrium condensation condition by virtue of the intimate contact of the vaporized and liquid crude so flowing upwardly through the successive heat chambers 20, i.e., the vapors on their upward passage are fractionally condensed in each of the sucessive heat chambers 23, thereby losing their higher-boiling components and growing gradually richer in lower-boiling components.

The thereby pre-conditioned hot crude passes into a flash vaporization chamber 29, FIG. 1, auxiliary to transition unit 22 through pipes 30 corresponding to the pipes 25, where vapors consisting essentially of light gasoline and naphtha are produced. These are removed at this doubling-back point of the crude by rising through passage 31 into upper chambers of transition unit 22 and, from there, into and through the fractionation units 21. That residual part of the hot crude which is not vaporized, consisting essentially of kerosene, gas-oil, and reduced crude bottoms, is doubled back from flash chamber 29 through passage 32 onto the upper surface of vaporizing plate 24 of transition unit 22, cascading on down from unit to unit for successive, partial vaporization thereof and gradually increasing in temperature from the flash vaporization temperature (360° F. to 400° F.) to the initial temperature (570° F. to 600° F.) of the hot crude feed.

Side walls 20b, FIGS. 2 and 6, of the respective units together with rectangular, strips-like weirs 33, FIGS. 1, 1A, and 6, pivotally supported along the forward edges of the respective vaporizing plates 24 and along their own upper edges on respective shafts 33a, FIG. 6, serve to retain predetermined pools or bodies of the downwardly cascading, residual crude on such vaporizing plates 24 for reheating and vaporization. Thus, the weirs 33 control depth and flow of the residual crude from vaporizing plate to vaporizing plate downwardly along the series of vaporization units 20.

The shafts 33a are swingable forwardly and backwardly by means of handles 33b, FIGS. 4 and 6, secured to opposite ends thereof, respectively, to permit variable bleeding off of sludge from the respective plates 24 during operation or complete drainage of liquid and sludge for cleaning purposes. In addition clean-out manholes having covers 26-1 are provided in the respective side walls 20b.

The vaporizing plates 24 and heat chambers 23 of the respective units 20 are shorter from front to back than are the side walls 20b, so that downcomer passages 34, FIGS. 1, 1A, and 4, having bottom discharge openings 35, are provided from unit to unit and between transverse walls 20c and weirs 33 thereof, to accommodate the cascading flow aforedescribed.

From the lowermost vaporizing plate 24, the final residual liquid, i.e. spent residue (being essentially reduced crude bottoms) flows out of the still through pipe 36, FIG. 1, nearly at the same temperature as the feed crude, thereby reducing the usual cost of heating prior to introduction thereof into a vacuum still for further treatment in the usual manner.

As afore-indicated, this flowing of the hot crude feed through the upwardly stepped heat chambers 23 to flash vaporization at the top of the series of vaporization units 20, and the passing of the vapors of lower boiling constituents from the point of flash vaporization upwardly through fractionating plates or trays and bubble devices while cascading the crude residual downwardly from pool to pool, as formed on top of and in heat-transfer relationship with the respective heat chambers, for reheating and vaporizing the higher boiling constituents, constitutes an outstanding feature of the invention. By this novel differential method of vapor formation in a continuous system, an unusually clean separation of distillation products is achieved. Moreover, the crude is topped most effectively for the recovery of overhead distillates by apparatus which is economical to produce and maintain and which efficiently utilizes the applied heat.

Since the heat chambers 23 are well insulated, the difference in temperature of the crude as introduced into the still (570° to 600° F.) and as flash vaporized (360° to 400° F.) is attributable to the heat imparted by it, by virtue of the successive partial condensation taking place in the several heat chambers and the latent heat of condensation released thereby, to the crude residual descending over the vaporizing plates 24 countercurrent to the inflowing hot crude feed. As the crude residual descends, its temperature is gradually increased from the flash vaporization temperature to the temperature of the inflowing hot crude, and the higher boiling fractions thereof are successively vaporized without intermixture with the lower boiling fractions.

*Vaporization-Rectification*

Upper chambers of the respective vaporization units 20 are equipped to handle the vapors arising from the crude residual as the latter descends from vaporizing plate to vaporizing plate.

In the form illustrated, each unit 20 has a bubble plate or chest structure 37, FIGS. 2 and 6, positioned upwardly of the vaporizing plate 24 and of the weir 33, for receiving, and for retaining in pool formation, reflux condensates flowing downwardly from fractionation units 21, and for defining the upper limits of respective vaporization chambers "A."

Each of the chest structures 37 is formed by a vaporizing plate or tray 38 and by a hood 39 overhanging such tray and defining a vaporization chamber "B" therebetween. The tray 38 and hood 39 of each unit extend between and are secured to front and rear transverse walls 20c of the unit, but fall short of the lateral walls 20b, thereof, the hood more so than the tray. At its lateral sides, tray 38 is provided with upstanding walls 38a, FIG. 2, which, with the unit's side walls 20b from which they are spaced, define respective upflow passages 40 leading from chamber "A" to a vaporization-rectification chamber "C" above hood 39. At its lateral sides, hood 39 is provided with depending walls 39a, which, with upstanding lateral walls 38a from which they are spaced, define respective downcomers 41 leading from the chamber "C" down into chamber "B." As illustrated in FIG. 4, it is preferred that the depending walls 39a extend diagonally of the units 20, so as to make chamber "B" wedge-shaped.

The top of chamber "C" is provided by a rectification plate 42 interposed between hood 39 and top wall 20d of the unit. Such plate 42 extends between front and rear transverse walls 20c and side walls 20b of the unit and is secured thereto in liquid-tight relationship therewith. Together with such top wall 20d of the unit, it defines a second vaporization-rectification chamber "D." Top wall 20d is apertured to provide access to the interior of the unit, a cover 43 normally tightly closing and sealing the aperture.

Rising from the bottom of tray 38, in liquid-tight relationship therewith and between depending walls 39a in chamber "B," are lateral walls 38b and transverse walls 38c, FIGS. 2 and 4, which serve to confine a body of liquid on such tray bottom.

The transverse wall 20c between two adjoining units 20 is apertured at 44 to provide free communication for both liquid and vapor between chamber "B" of one unit 20 and registering chamber "C" of the next forward and downwardly-stepped unit. A similar aperture 45 in the forward wall 20c of the next forwardly and downwardly-stepped unit 20 provides similar communication between such chamber "C" and registering chamber "D" of such last-named, next forward, and downwardly-stepped unit 20. Thus, the chambers "B," "C," and "D" of three successive units freely intercommunicate and provide, in effect, a single, elongate, composite, vaporization and rectification chamber above a single elongate, composite, evaporation plate or tray, whereby an exceptionally long and low velocity path for flow of reflux liquid is provided.

Lateral walls 38b in chamber "B" preferably extend diagonally of the units as do depending lateral walls 39a, so that transitional flow of both liquid and vapor is directed in a most advantageous manner. Lateral walls 39b and 42b, rising from and extending along rectifying plates 39 and 42, respectively, of chambers "C" and "D," respectively, and representing, in effect, elongate continuations of lateral walls 38b of chamber "B," serve to confine liquid upon such plates in the same way that such walls 38b do with respect to vaporizing plate 38 of chamber "B."

A transverse, pivotally mounted weir 46 controls overflow of liquid from the composite evaporation plate or tray 38–39–42 which extends through and forms the bottom of the composite vaporization and rectification chamber B–C–D. Both transverse wall 38c and weir 46 advantageously have their upper edges serrated, as indicated.

For cleaning and related purposes and to enable one or more of the composite plates to be cut out from operation (particularly in the alcohol still), outflow weir 46 is capable of being swung on its pivot mounting into a raised position by means of handles 46b in the same way that inflow weir 33 is by means of its handles 33b.

The reflux liquid flowing over and retained upon composite evaporation plates or trays 38–39–42 of the respective composite chambers B–C–D is reflux condensate supplied both from the upper section of the still through outlet 50, FIG. 1, of downcomer passage 51 of the lowermost fractionation unit 21, and from condensation reactions within the rectifying upper portions of the respective vaporization units 20, themselves.

Vapors rising from vaporizing plates 24 of the respective chambers "A" and passing upwardly through the laterally-disposed, upflow passages 40, FIGS. 2 and 4, into chambers "C" of the respective composite chambers B–C–D mingle with vapors rising from respective rectifying plates 39 and with vapors migrating from respective chambers "D," and, together therewith, pass through risers 52 (FIGS. 7, 8, and 9) of bubble tube devices 53 and 53–1, FIGS. 1 and 2, of the "D" and "C" portions of the respective, immediately superimposed, composite chambers B–C–D, into headers 55 and down through a multiplicity of bubble tubes 56 of such devices to discharge below the surface of those portions of the respective pools of reflux liquid which rest on the 39–42 portions of respective composite plates 38–39–42.

Meanwhile, vapors rising from vaporizing plates 38 of the respective chambers "B" pass upwardly through the risers 52 of bubble tube devices 53–1 of the "C" portions of the respective, immediately superimposed, composite chambers B–C–D into the headers 55 and down through the multiplicity of bubble tubes 56 of such devices to discharge below the surface of those portions of the respective bodies of reflux liquid that rest on the 39 portions of the respective composite plates 38–39–42, see the broken lines 57 in FIGS. 8 and 9 indicating liquid level.

The rising vapor serves to heat the bodies of reflux liquid from below, thereby vaporizing more and more of the lower boiling fractions therefrom, while such reflux liquid serves to cool the vapor bubbled therethrough, thereby condensing more and more of the higher boiling fractions of such vapor.

From the uppermost chamber of the transition unit 22, the final vapor—rich in low-boiling fractions—passes through conduit 58 into the series of fractionation units 21 constituting the upper section of the still.

The reflux condensate flows over the outflow weir 46, FIGS. 1, 1A, and 4, of each composite evaporation plate 38–39–42 in turn, the flow being directed backwardly along the lateral sides of the 42 and 39, or "D" and "C," portions of the respective composite plates by flow channels 59, FIGS. 2 and 4, to the laterally disposed downcomers 41 that discharge into liquid-seal traps 60, FIG. 2. In this circuitous way, the reflux condensate cascades from composite evaporation plate to composite evaporation plate, down the length and height of the stepped, lower section of the still, becoming richer and richer in the higher boiling fractions.

Such reflux condensate is drawn off at suitable intervals as it descends by means of multiple draw pipes 61, FIGS. 2 and 4, leading to storage tanks (not shown) for the respective products, and finally discharges, at 61–1, FIG. 1, from the lowermost plate 38.

In order to hold back foam and prevent liquid from being blown over the weirs 46, respective baffles 46–1 are provided to dip below the reflux liquid.

*Bubble Tubes*

The bubble tube devices 53 and 53–1 are essentially similar in construction. They have their respective headers 55 formed with troughed and ridged tops 55a, see particularly FIGS. 7 and 9, for catching and for directing into downspouts 62 reflux condensate that is formed incidentally in the upper portions of chambers "C" and "D" by the rising vapors as they contact the relatively cooler undersurfaces of plates 42 and top walls 20d and, also, reflux condensate that descends from the immediately superimposed bubble tube devices in the next chamber above, as explained hereinafter.

Reflux condensate formed incidentally within headers 55 by vapors that contact the undersurfaces of the ridge tops 55a of such headers, see FIGS. 7 and 9, flows downwardly through downcomers 63 and 63–1, respectively. Downcomers 63 discharge through traps 63a at their lower ends into the troughed and ridged tops of the respective bubble tube devices 53–1 immediately therebelow. Downcomers 63–1 extend downwardly into the 38 or "B" portions of the respective composite evaporation plates 38–39–42 located immediately therebelow, see FIG. 4, where their open lower ends are submerged in reflux and effectively sealed thereby.

Thus, it can be seen that there is a continual flow of vapor upwardly through the several chambers "B," "C," and "D" of each of the vaporization units 20 and along the several composite chambers B–C–D of the upwardly-stepped units 20, countercurrent to a continual downflow of reflux condensate over and along successive composite evaporation plates 38–39–42 of such stepped units 20 and in intimate, bubbled, vapor-liquid contact with the reflux condensate.

The bubble tubes 56 and downspouts 62 discharge into the composite evaporation plates from which the respective bubble tube devices rise. In order to overcome any tendency toward the building up of undesirable liquid gradients in the vicinity of the feed of liquid reflux to the respective plates, a feature of the invention is to cant the lower, discharge ends 56a, FIG. 8, of the respective bubble tubes in the direction of liquid flow, thereby utilizing the force of the injected vapors to increase the flow velocity of the liquid into which the vapors are bubbled. The extent of such canting will depend, in any given instance, upon the length of the composite plate, the liquid consistency, and the velocity of the vapor flow through the bubble tubes.

The mutually spaced and parallel risers 52 define unobstructed, elongate, flow channels 64 therebetween, along which the reflux liquid flows to best advantage under the impetus of the injected vapors from bubble tubes 56. Accordingly, the depth 57 of liquid on each composite evaporation plate is substantially uniform along the length and breadth of the plate and uniform bubbling of the vapors through the liquid is achieved.

It will be noted from FIGS. 8 and 9 that the bubble tube devices 53 and 53–1 provide respective vapor chambers 65 within the headers 55, and that the open upper ends 56b of the respective bubble tubes 56 are above floor level of such chambers, as are also the open upper ends 52a of the respective risers 52. Thus, the inner bottom surfaces of the chambers serve as troughs to collect reflux condensate and direct it into the respective downcomers 63 and 63–1, see particularly FIG. 7.

Because of the distance vapors must travel through the heights of the respective risers 52, liquid mechanically entrained in the rising vapors is practically eliminated. Moreover, the bubble tubes 56 minimize splashing, which in turn, minimizes mechanical entrainment. In addition, the bubble tubes serve as baffles with respect to the bubbled vapor rising around them, thereby tending to remove entrained reflux liquid from such vapor.

Fractionation or Rectification

Reverting now to FIG. 1, the vapor passing through conduit 58 into the series of fractionation or rectification units 21 is rich in low-boiling fractions. It is bubbled through reflux liquid from unit to unit as it rises, and is finally discharged through a conduit 66 into stabilizer S. Reflux liquid from such stabilizer flows back into the uppermost fractionation unit 21 through the looped trap 67, and cascades downwardly from unit to unit, providing the liquid through which the vapors are bubbled in such units.

The units 21 are generally similar in construction to the units 20, in so far as the step arrangement is concerned. Each is provided with a bottom wall 21a, FIGS. 1 and 3, lateral walls 21b, forward wall 21c, and top wall 21d, the latter having an access opening therethrough provided with a removable cover 70. The stepped units are contiguous, so that the forward wall of each unit becomes the rear wall of the unit immediately forwardly thereof, as in the case of the units 20.

Each unit 21 has a downcomer 73 leading from its bottom 21a to the bottom of the next forward unit, whereby reflux liquid flows across the bottom of each unit and cascades downwardly from unit to unit. Pivoted weirs 74, corresponding to the weirs 33 of the units 20 and swingable by means of handles 75, control the flow of reflux from the respective units and the formation of pools of reflux on the bottoms 21a.

Each unit 21 is divided into chambers E, F, and G by means of a chest structure of trough formation spaced from the lateral walls 21c of the unit to provide upflow passages 76 for vapors ascending from the lower or reflux chamber E. Such passages 76 lead into the upper chamber G, which, together with intermediate chamber F, is formed by a rearwardly and downwardly sloping horizontal partition 77. Such partition terminates short of the forward wall of the next unit and is provided with a depending apron 77a to define a downcomer passage 78 for conducting reflux that collects on the upper surface of such partition down into the reflux chamber E. A bank of bubble tubes 79 extends through the bottom 80 of the chest structure so as to terminate below the normal reflux level (i.e., the level of reflux liquid on the bottom 21a of the unit).

Vapor passing through angular conduit 58 into the lowermost of the fractionation units 21 enters intermediate chamber F of that unit, from where it descends into reflux chamber E of that same unit by way of the bubble tubes 79.

After bubbling through the pool of reflux liquid maintained in such chamber E, the lower boiling fractions that do not condense in the reflux liquid rise upwardly through the upflow passages 76, FIG. 3, past chamber F and into the upper chamber G, which in effect provides a quieting zone where the vapor travels horizontally and has its velocity reduced so that mechanically entrained droplets of reflux liquid drop onto the sloping partition 77 and drain through downcomer 78 into the pool of reflux liquid in compartment E of that same unit. In continuing its travel the vapor ultimately migrates through ports 81 between successive units into the intermediate chamber F of the next higher unit 21.

In this way, vapor representing the lower boiling fractions passes upwardly through the successive units 21 in stepwise fashion, that is to say, by flowing along alternate vertical and horizontal paths, meanwhile getting rid of more and more of its higher boiling fractions, and finally discharging into stabilizer S through conduit 66. The reflux, on the other hand, representing the condensed higher boiling fractions, passes downwardly in generally similar manner through the successive units 21 and into the units 20 of the lower section of the still for ultimate disposition as aforedescribed.

It will be noted that the bubble tubes 79 and 56 serve also to effect a certain dephlegmation of the vapor passing therethrough, by reason of the large heat exchange areas presented by such tubes. Thus, there is condensation of vapor within the tubes and vaporization of entrained liquid droplets from reformed vapor which contacts the outer surfaces of the tubes, resulting in drying of such vapor.

RECTIFICATION OF ALCOHOL

As indicated previously, the invention may be employed for the distillation or rectification of alcohol and other chemical liquids and semi-liquids. To exemplify this aspect of the invention, a preferred form of an alcohol stripping and rectifying still, or so-called "mash" or "beer" still, conforming to the invention, is illustrated in FIGS. 10 and 11, where the individual units are designated 90.

Disadvantages of Prior Art

In general, there are two basic types of distillation procedures presently used in the separation of a desired alcoholic distillate from a fermented mash. One is a batch procedure carried out in a so-called "pot still." The other is a continuous procedure carried out in a stripping and rectifying column, often spoken of as a "mash" or "beer" column. The two procedures differ from each other mainly in their respective methods of vapor formation. While the pot still produces a higher quality beverage product, the continuous still has a greater productivity. It is, therefore, more attractive from an economic standpoint. A number of variations and modifications of these procedures are employed in an attempt to minimize disadvantages or magnify particular advantages. While both procedures are widely used, neither is entirely satisfactory from both economic and product quality considerations.

In a batch or pot-still operation, the distilling material is charged into a pot, heat is applied, and a portion of the charge is distilled over, being continuously condensed. As the more volatile components of the charge are found in greater concentration in the vapor than in the liquid, the latter grows poorer in the more volatile components as the vaporization proceeds. Consequently, both the composition of the boiling liquid and the composition of the vapor evolved are changed during the distillation. This feature of the pot-still operation presents an important and, perhaps, the only advantage in preference to the continuous operation, as it enables collection of the distillate by portions, i.e., permits a qualitative grading of the produced distillate. The disadvantages, however, are that there is extravagance in steam consumption and the still can only be operated periodically, entailing loss of time in charging and heating up the batch and further loss of time for cleaning the still after each batch.

In a continuous still, instead of applying heat to a large volume of charge in a pot, the feed is spread in relatively thin layers over a series of horizontal plates which are usually equally spaced in an upright shell, termed a "column," and heat is supplied by introduction of steam at the bottom of such column. The charge is pumped continuously into the top section of the column and flows downward from plate to plate. The volatile portions are gradually evaporated as the feed comes into contact with the ascending steam. By the time the feed has reached the lowest plate, it has lost all its alcohol and passes out at the bottom of the column as residual liquid. The vapor and liquid streams are withdrawn from the still, so that there is no accumulation or depletion of material in the system. Hence, the composition of the liquid and the vapor remain constant during the operation.

Volatility of the components of an alcoholic mixture does not depend on their basic boiling points, as is commonly believed, but varies during the distillation process in accordance with the solubility of such components in a given alcoholic mixture. Thus, the separation of these components—particularly fusel oil and aldehydes—from an alcoholic beverage product, without removing or destroying the components that impart taste, aroma, and other desirable characteristics, is highly complicated and difficult.

In spite of the great difference between the boiling points of ethyl alcohol (78.4° C.) and fusel oil (about 132° C.), the latter shows greater volatility than ethyl alcohol if the alcoholic content of the boiling liquid is less than 42%. On the other hand, the volatility of the fusel oil drops much lower than that of the ethyl alcohol when the alcoholic content of the boiling liquid is more than 42%.

Two distillations are usually employed in the batch procedure in order to incorporate the delicate flavors and aromas in the distillate product and to hold out the congeners, such as fusel oil and aldehydes, that impart a disagreeable taste and smell.

In the first distillation, a fermented mash of approximately 10% alcoholic content is charged into the distillation pot, and a portion of this charge is distilled over to form a distillate having an alcoholic content of approximately 28%.

In the second distillation, such distillate is charged into a second distillation pot equipped with rectification or dephlegmation devices. Inasmuch as both the liquid and vapor are constantly changing in composition during the pot still process, the distiller is able to make cuts of respectively different compositions. Distillate from this second pot is usually taken in three cuts. The first cut consists mostly of the very volatile products, chiefly aldehydes, esters, and ethyl alcohol. The next cut is the required product, the so-called "middle-run" containing approximately 69% ethyl alcohol, water, and the components with the desirable flavors and aromas. The third cut is mostly water, fusel oil, and a decreased quantity of ethyl alcohol.

This second distillation must be carried out on the basis of a very quiet boiling rate and low vapor velocity to enable the operator to prevent mechanical entrainment of fusel oil in the "middle-run" and to hold it back for the third cut. In this way, alcoholic beverage products of acceptable quality are produced. That explains why many beverage manufacturers continue to employ pot stills, even though they are considerably more expensive to operate than are continuous stills, particularly in the larger establishments.

Distilleries employing continuous methods of distillation almost universally employ two types of distillation apparatus, namely, a "mash" or "beer" still for the stripping of the fermented mash or alcoholic feed material of its alcoholic compounds, and a rectifying column for rectifying the alcohol to the desired degree of purity.

While neutral spirits, free of fusel oil, can be produced with this continuous equipment, beverage products comparable to those produced by "pot still" methods cannot be.

The alcoholic strength on each plate of the conventional continuous still remains in equilibrium during the distillation process. Thus, the operator is unable to withdraw separate cuts of different compositions, and it is impossible to separate the fusel oil without going into the production of neutral spirits, which destroys the esters imparting flavor and aroma to an alcoholic beverage.

As previously mentioned, fusel oil becomes more volatile than ethyl alcohol when the content of the latter in a mixture of the two is less than 42%. However, in conventional, continuous, distillation practice applied to an alcoholic mash or the like, it is impractical to attempt any clean separation of the two until the ethyl alcohol content of the mixture rises to 96%, at which point none of the fusel oil volatilizes. This is so because fusel oil is present in relatively small amounts. Thus, in the usual instances, fusel oil represents only about one tenth to four tenths of one percent of the total alcohol content. At the 96% concentration of ethyl alcohol, volatilization thereof leaves the fusel oil behind. It washes back with the reflux, and accumulates as a liquid in a zone where the ethyl alcohol content is from 40% to 45%, which is near the bottom of the rectifying column. It floats on the heavier body of ethyl alcohol in this zone, and may be drawn off in the liquid state. This is common practice in the production of industrial alcohols and neutral spirits.

In the production of alcholic beverages, however, such as whiskey, brandy, rum, etc., by conventional stripping stills and rectifying columns, the maximum content of ethyl alcohol is less than 80% in order to retain flavor and aroma. Accordingly, fusel oil is carried off in the product and never has a chance to concentrate.

Because of the relatively low alcoholic strength of the liquid at the top of these continuous stills, as just explained, and, also, because of the high vapor rate, the fusel oil cannot be withdrawn separately from the product. The beverage distillate thus contains most of the lower boiling components and the fusel oil, which would normally be in the first and third fractions, respectively, of a pot distillation and which would be kept separate from the beverage product in such a distillation.

A structural disadvantage of conventional "mash" or "beer" column stills that leads to serious functional disadvantages is the fact that perforated or so-called "sieve" plates are employed. These stills cannot be operated at less than 60% of the full vapor rate, because, if they are, the liquid on the plates will drain through the perforations and drop to the bottom of the column. This means that operations cannot continue until the liquid is raised to the proper level on the several plates. Moreover, the plates are usually of large diameter and are fabricated from light copper sheeting. They often warp, which makes for non-uniformity in the depth of the liquid thereon, causing the steam vapor used as a heating medium to jet through shallow parts and causing any solid matter in the material being distilled, for example, skins, stems, and seeds in grape pomace used in brandy distillation, to pack in deep portions of the liquid. The latter condition often leads to plugging of the plates, which means expensive shut-down time, increased maintenance cost, and the danger of an explosion due to excessive pressure of the trapped steam.

In addition to the above, the live steam used in these conventional column stills as a direct heating medium burns off the delicate flavors and aromas characteristic of various beverage products. Moreover, even in a pot still, boiling of the charge for prolonged periods of time, as is necessary, tends to destroy flavor and aroma.

*Chamber Still of the Invention*

These structural and functional disadvantages of conventional continuous stills for the production of alcoholic beverages are eliminated by the present invention, and superior products, having quality equivalent to or better than the best obtainable under batch or pot distillation practices, are obtained, along with unusually high operating efficiency.

As in the case of the pot still, and contrary to the conventional continuous stills, the composition of the boiling liquid and the composition of the vapor evolved in the chamber still of the present invention are constantly changing during the course of the distillation.

Because it is not necessary to maintain a high vapor velocity in this chamber still, it is possible to continuously draw off a part (e.g., 25% by volume) of the vapors at the 40-45% zone, without disturbing operation of the still, for passage through a fusel oil column where the ethyl alcohol content is raised to 96% and the fusel oil and furfural are concentrated and drawn off in the liquid state in the manner previously explained in connection with conventional practice. The high strength ethyl alcohol, stripped of its fusel oil and furfural content, is returned to the beverage product at a later stage of the over-all procedure.

Since the quantitative ratio of fusel oil to alcohol decreases as the alcoholic strength increases, and, since fusel oil and furfural actually concentrate in the 40% to 45% zone because of the low vapor velocity and quiescence of liquid in this chamber still, drawing off part of the vapors at the 40% to 45% zone (the zone of highest ratio) means that, considering the low vapor velocity, the greater part of the fusel oil may be eliminated, without impairing either the quality of the beverage product or the operating efficiency of the still.

It is desirable that a small part of the fusel oil remain in the product for flavor, as it does under these circumstances.

Important, too, in this connection is the fact that feed of the alcoholic material for distillation is above the 40% to 45% zone, while the feed is below that zone in conventional stills. This further increases the quantitative ratio of fusel oil to alcohol in the 40% to 45% zone, and enhances separation, because all the vapors must pass through that zone in the conventional still, while only a part pass through in the present still.

This chamber still for the stripping and rectification of alcohol is essentially similar to that aforedescribed herein with respect to the distillation of petroleum, but, unlike that petroleum still, heat is supplied to the vaporizing or stripping plates 95 of successive units by steam passed through the heat chambers 94 of such units counter-current to the descending material being distilled.

Preheated feed material, such as an alcoholic mash, is introduced onto the vaporizing plate of the uppermost unit through a feed box 100, and flows downwardly—from vaporizing plate to vaporizing plate—to final discharge, as slop, as the lowermost unit, meanwhile being heated indirectly by the steam in heat chambers 94. The vapors formed above the vaporizing plates pass upwardly into the rectifying section of each unit and thence to an aldehyde separator provided as a separate piece of equipment. They do this without refluxing any condensate back to the stripping section.

Since the stripping in this still is accomplished by indirect heating without the use of open steam, delicate flavors and aromas are preserved. Moreover, the spent feed material or slop, stripped of volatiles and some of its water, constitutes only about two thirds of the original feed volume. This compares with a much greater slop volume in conventional stills. Thus, handling costs for dehydrating or disposing of the slop is greatly reduced.

The productivity of a still in terms of both quantity and quality of the product depends on the evaporation area. The evaporation area of this chamber still is much greater than that of a conventional continuous still. Therefore, its productivity is far superior. Also, intensiveness of boiling of material on the exceptionally large evaporation plates can be adjusted to be as smooth as required by control of the vapor velocity, without lowering the operating efficiency of the still. The ascending, distillate vapors are bubbled for rectifying purposes through alcoholic liquid which ordinarily ranges in alcoholic content from 40% to 85%.

*Vaporization*

Each unit 90 has a bottom wall 90a, lateral walls 90b, a forward wall 90c, and a top wall 90d in general conformity with the structure of the preceding embodiment. As in that preceding embodiment, the lateral walls are here provided with manholes having covers 91 and 92, respectively, and the top wall is provided with an access opening, having a cover 93. Also, the successive units are contiguous, so that the forward wall of one becomes the rear wall of the next forward unit.

A heat chamber 94 topped by a vaporizing plate 95 is provided for each of the units 90 in much the same manner as in the petroleum still aforedescribed, the chambers 94 of the several units being interconnected in fluid-flow communication by a series of pipes 94–1 at both of the opposite lateral sides of the still so that a heating fluid, such as steam, may be passed from heat chamber to heat chamber.

Weirs 96, swingable out of and back into liquid-confining positions by means of handles 97, dam the downward flow of the alcoholic material being distilled to form pools 98 of such material on the respective vaporizing plates 95; and downcomer passages 99 provide for the cascading flow of such alcoholic material from unit to unit, as in the petroleum still.

Here, the alcoholic material to be distilled is introduced into a feed box 100 of the topmost unit, and flows onto the vaporizing plate 95 of that unit through a passage 101, FIG. 10, cascading from uint to unit through the downcomers 99. The spent residue, or slop, discharges from the lowermost of the units 90 by way of outflow piping 102. It may be run directly to waste or evaporation through piping 103, but part or all is preferably passed through piping 104 under control of a valve 105 to a heat-exchanger 106, where it serves to preheat the alcoholic material to be distilled as such material flows through inflow piping 107 to feed box 100 under the impetus of a pump 108.

*Heating*

Steam is introduced into the lowermost heat chamber 94 by supply piping 109, FIG. 10, from any suitable source, the usual control valves 110, 111 and 112 being provided as indicated.

The steam ascends from heat chamber to heat chamber of successive units by way of the pipes 94–1, flowing countercurrent to the descending alcoholic material being distilled. Condensate drains out of the respective heat chambers through piping 113 under the control of respective, manually controlled valves 114. Manholes 91 afford access to the interior of the heat chambers for purposes of cleaning and repair.

*Vaporization-Rectification*

Alcoholic vapor rising from the material being heated on vaporizing plate 95 of each unit 90 ascends in the manner described in connection with the first embodiment of FIGS. 1–9 and passes from the upper end of the still into an aldehyde separator "A" by way of conduit 115 after having bubbled through reflux liquid cascading from composite rectification plate (not shown) to composite rectification plate as aforedescribed, it being realized that such composite rectification plates are identical with the composite evaporation plates 38–39–42 of the previous embodiment, see FIG. 4. The final liquid flowing from pipe 116 is essentially water.

No products are drawn from this still corresponding to the fractionation products of the petroleum still. The vapor passing into a separator "A" for acetaldehyde becomes the final beverage product following removal of the acetaldehyde. Reflux therefrom flows back into the still through pipe 117, FIG. 10.

Such acetaldehyde separator "A" may be of any suitable construction for the purpose, but is preferably the stabilizer "S" referred to hereinbefore.

Fusel oil and furfural separation is as explained above. Part of the vapor (usually 25%) from the zone where the ethyl alcohol content is from 40% to 45%, is withdrawn through piping 118 under the control of a valve 119 and sent through fusel oil column "F," from where 96% ethyl alcohol vapor, stripped of fusel oil and furfural, is sent to the acetaldehyde separator "A" to join the main stream of ethyl alcohol vapor from the chamber still. Reflux passes back into the still through pipe 120.

Alcoholic strength of the liquid on the composite rectification plates of the several units 90 of the still is controlled by weirs 121 corresponding to the weirs 36 of the previously described embodiment.

Whereas this invention is here illustrated and described with respect to preferred specific embodiments thereof, it should be understood that various modifications and adaptations may be resorted to by those skilled in the art without departing from the essential inventive concepts disclosed and claimed.

I claim:

1. Distillation apparatus, comprising a stepped series of vaporization units, each unit including a horizontally disposed, bottom plate, heating means disposed beneath said bottom plate for vaporizing liquid material thereon, a weir disposed adjacent to and above said bottom plate for normally confining on said bottom plate a body of said liquid material undergoing distillation, structure defining a plurality of rectification chambers superimposed immediately above and in vapor communication with said bottom plate for receiving, condensing, and rectifying through liquid-vapor contact with the liquid, as reflux, formed by such condensing, the distillation vapor from said liquid material, said structure including walls and horizontal plates serving to confine and direct flow of said distillation vapors and such of said liquid material as remains unvaporized as reflux liquid, and bubble tube means for passing said distillation vapors from a lower chamber to a higher chamber and for bubbling them below the surface of said reflux liquid within said higher chamber, said structure providing flow passages from said bottom plate directly to the horizontal plates and chambers thereabove; structure defining passage for such of said reflux liquid as overflows from the bottom plate of each higher unit to the bottom plate of the next lower unit; structure defining passage for the flow of said reflux liquid and said distillation vapors from unit to unit; means for continuously flowing said liquid material to be distilled onto the bottom plate of the highest of said units; means for continuously discharging, from the bottom plate of the lowest of said units, as spent residue such of said liquid material undergoing distillation as is not ultimately vaporized; and means for discharging distillation vapors from the upper portion of the highest of said units.

2. The distillation apparatus of claim 1, wherein the horizontal plates of the respective units are rectangular.

3. The distillation apparatus of claim 2, wherein the weirs of the units are of rectangular strip-like configuration, of transverse disposition with respect to fluid flow, and are pivoted on respective horizontal axes to swing away from and back into liquid-confining position.

4. The distillation apparatus of claim 1, wherein the units are contiguous and integral one with another, front to back, with next forward and with next rearward units of the series.

5. The distillation apparatus of claim 1, wherein said heating means of each unit is formed by respective structure defining a fluid-containing, heat chamber immediately below and in heat-imparting relationship with said bottom plate, the several heating means being serially connected in fluid flow relationship.

6. The distillation apparatus of claim 1, wherein a stepped series of fractionation units extends upwardly from communication with the highest vaporization unit, each fractionation unit including at least a lower chamber having a weir for confining a body of reflux liquid on the bottom of said chamber, an intermediate chamber for vapor, an upper chamber for vapor, and bubble tubes extending from said intermediate chamber to below the surface of said reflux liquid in said lower chamber; wherein the vapor-discharge means of the highest vaporization unit is connected in vapor-flow relationship with the intermediate chamber of the lowest fractionation unit; wherein there is structure defining passage for the flow of reflux liquid from the bottom of the lower chamber of each higher fractionation unit, above the weir of that unit, to the bottom of the lower chamber of the next lower fractionation unit, and from the bottom of the lower chamber of the lowest fractionation unit onto an upper plate of the highest vaporization unit; wherein there is structure defining passage for flow of reflux liquid from the bottom of the upper chamber of each fractionation unit to the bottom of the lower chamber of each fractionation unit; wherein there is structure defining passage for flow of distillation vapors from the lower chamber of ecah fractionation unit to the upper chamber thereof, by-passing the intermediate chamber thereof; wherein means are provided for passing distillation vapors from the highest fractionation unit to stabilizing apparatus; and wherein means are provided for introducing reflux liquid from said stabilizing apparatus onto the bottom of the lower chamber of said highest fractionation unit.

7. The distillation apparatus of claim 6, wherein each of said vaporization units is provided with heat chamber defining structure and wherein said heat chamber defining structure of the lowermost unit is provided with means introducing therein the distillation feed-pre-heated to flash vaporization temperature; wherein said heat chamber defining structure of the uppermost unit is provided with means in fluid-flow communication with the bottom plate of said uppermost vaporization unit, for flash vaporizing the said distillation feed; and wherein said units are provided with means for drawing off fractional distillation of products along the length of the series of vaporization units.

8. The distillation apparatus of claim 7, wherein the means for flash vaporizing the distillation feed is also in flow communication with upper chambers of the uppermost vaporization unit.

9. The distillation apparatus of claim 8, wherein the lowermost chambers of the respective vaporization units are serially connected in cascading, liquid-only communication with one another; and wherein the upper chambers of each of the vaporization units are connected in both liquid and vapor flow communication with respectively next lower chambers of upwardly succeeding units, to provide elongate, composite, vaporization and fractionation plates and chambers which respectively traverse a plurality of successively disposed vaporization units.

10. The distillation apparatus of claim 9 wherein a weir is provided for each of the composite plates to regulate the depth of reflux liquid retained on said plates.

11. The distillation apparatus of claim 1, wherein said heating means is formed by respective structure defining a fluid-containing, heat chamber immediately below and in heat-imparting relationship with said plate, the heat chambers of the several units being serially interconnected in fluid-flow communication; and wherein the lowest one of said units is provided with means for introducing steam into the heat chamber thereof.

12. The distillation apparatus of claim 11, wherein the units are adapted for the distillation of an alcoholic material; there is provided apparatus for eliminating acetaldehyde; means are provided for passing distillation vapors from the highest unit to said apparatus for eliminating acetaldehyde; means are provided for passing reflux from said apparatus for eliminating acetaldehyde back into said highest unit; wherein there is provided a fusel oil column means are provided for passing a portion of the vapors to said fusel oil column from an intermediate unit adjacent to said highest unit, whereby to eliminate the greater part of the fusel oil and furfural; and means are provided for passing alcoholic vapors essentially free of fusel oil and furfural back from said fusel oil column into said distillation apparatus.

13. The distillation apparatus of claim 1, wherein there are provided manholes leading into the respective chambers in which the bottom plates are disposed, for cleanout purposes.

14. Distillation apparatus, comprising: a series of vaporization units arranged in intercommunicating, step formation and respectively provided with means for cascading distillation feed liquid from unit to unit and with means for vaporizing said feed liquid in each unit as it descends, said vaporization units also having respective bubble plate structures arranged in correspondingly stepped series above and in direct, vapor communcation with said vaporizing means and conduit means directly interconnecting said vaporizing means with said bubble plate structures, respectively, for such direct, vapor communication, said bubble plate structures intercommunicating with one another and being adapted to receive vaporized feed liquid from said vaporizing means.

15. A method of topping petroleum crudes, comprising heating a petroleum feed crude; flowing such feed crude to a location of flash vaporization and subjecting it to flash vaporization to produce flash vaporization vapors at said location; conducting said vapors from said location through fractionation apparatus; and flowing from said location as residual crude such of said feed crude as is not vaporized thereat in countercurrent heat exchange relationship with said feed crude along its path toward said location for heating and vaporizing said residual crude.

16. A continuous method of stripping and rectifying alcoholic materials, comprising continuously flowing an alcoholic material through a series of pools; continuously boiling said material in said pools to form vapors; continuously condensing said vapors to form reflux liquid; continuously passing said vapors through said reflux liquid to accomplish continuous rectification; continuously flowing said vapors from said pools countercurrent to the flow of said material and out of contact therewith to near the source of said alcoholic material; continuously treating said vapors near said source for the separation of unwanted components; collecting said reflux liquid from said vapors during said treatment and flowing it countercurrent to the flowing vapors through a series of reflux-retaining pools separate from said pools of alcoholic materials; and bubbling said vapors through said pools of reflux liquid during their countercurrent flow.

17. The method of claim 16, wherein the alcoholic material supplied includes ethyl alcohol, fusel oil and furfural, and wherein the pools of reflux liquid have an ethyl alcohol content ranging from below 42% at one end of the series to 80% at the other end of the series; and wherein a part of the vapors from the portion of the series where the ethyl alcohol content is 42% and is continuously drawn off and treated for the separation of fusel oil and furfural.

18. In a distillation process wherein a material to be distilled is vaporized and partially condensed, that portion of the vapor which is condensed being collected to serve as reflux liquid for vapor-liquid contact an improved process of rectification comprising passing the distillation vapors downwardly through bubble tubes whose lower ends are submerged in said reflux liquid, while passing the lower temperature, reformed vapors that emerge from said reflux liquid in intimate contact with said bubble tubes exteriorly thereof to effect by heat exchange therebetween condensation of vapors within said tubes and drying of said reformed vapors exteriorly of said tubes.

19. In a continuous distillation process wherein a material to be distilled is vaporized to produce vapor and reflux liquid and the vapor is passed countercurrent to said reflux liquid, the improvement comprising countercurrently passing said vapor progressively upwardly and said reflux liquid progressively downwardly along a progressive, unidirectionally stepped path having alternate vertical and elongated, disentrainment horizontal portions, so that said vapor flows progressively through quieting, disentrainment zones within respective ones of said horizontal portions and upwardly along said path; collecting disentrained condensate at said zones and passing said condensate to said reflux liquid; bubbling said vapor through the reflux liquid in the horizontal portions of said path to accomplish rectification; discharging vapor at the upper end of said path; and discharging reflux liquid at the lower end of said path.

20. In a distillation process wherein a material to be distilled is vaporized to form vapor and reflux liquid, an improved method of rectification, comprising progressively passing the distillation vapors through multiple cycles, each of which involves bubbling said vapors through said reflux liquid to reform said vapors; flowing the reformed vapors along a torturous, vertical path in heat-exchange relationship with the incoming vapors preparatory to bubbling thereof; and thereafter flowing said reformed vapors along a horizontal quieting path at low velocity to the next cycle.

21. In distillation apparatus wherein means are provided for vaporizing a material to be distilled to produce vapor and reflux liquid, rectification structure for the vapors, comprising walls defining a first chamber having an inflow opening for said vapors; walls defining a bubble chamber below said first chamber; means for flowing reflux liquid into said bubble chamber; bubble tubes extending from said first chamber into said bubble chamber and below the normal level of reflux liquid therein; walls defining a third chamber above said first chamber; conduit means for the flow of vapors, said conduit means extending from communication with said bubble chamber to communication with said third chamber, by-passing said first chamber; and means for conducting vapors from said third chamber.

22. Distillation apparatus, comprising a stepped series of vaporization units, each unit including a horizontally disposed, bottom plate provided with heating means for vaporizing liquid material thereon to form distillation vapors and reflux liquid, a weir for normally confining on said bottom plate a body of liquid undergoing distillation, structure defining at least three chambers superimposed above the bottom plate for receiving distillation vapors therefrom, said structure including walls and horizontal plates serving to confine and direct flow of reflux liquid and of distillation vapors, so that vapors from a lower chamber flow past the next higher chamber to the chamber thereabove, and bubble tube means extending from a higher chamber to the next lower chamber and below the liquid level on the plate of said lower chamber for passing distillation vapors from said higher chamber to said lower chamber and for bubbling them below the surface of reflux liquid upon the said plate of said lower chamber; structure defining passage for overflow liquid from the bottom plate of each higher unit to the bottom plate of the next lower unit; structure defining passage for the flow of reflux liquid and distillation vapors from unit to unit; means for continuously introducing the liquid material to be distilled onto the bottom plate of the highest of said units; means for continuously discharging, from the bottom plate of the lowest of said units, the remaining liquid residue of said material undergoing distillation; and means for discharging distillation vapors from the upper portion of the highest of said units.

23. Bubble tray apparatus including, in combination, a tray; and a bubble tube device affixed to and disposed above said tray, said device comprising: a header fixedly disposed above said tray; riser means affixed to said tray for conducting vapor beneath said tray up to said header; and a multiplicity of bubble tube means, depending from said header such that their lower ends are disposed closely adjacent and above said tray, for bubbling said vapor from said header through fluid contained in said tray.

24. Apparatus according to claim 23 wherein said bubble tube means are unidirectionally canted away from the vertical with respect to said tray, said bubble tube means thereby inducing the flowing of said liquid by said vapor bubbling therethrough.

25. The apparatus of claim 23, wherein said header has a roof of interior trough formation and downcomer communicating with the trough-like interior of said roof.

26. The apparatus of claim 25, wherein said roof has an inner bottom surface, the upper ends of said bubble tube means projecting above the inner bottom surface of the header; and wherein said downcomer extends from said inner bottom surface of the header.

27. In combination, a rectangular, horizontal vaporization plate, means for introducing material to be vaporized onto one end of said plate in a uniform manner, and a transverse, rectangular, strip-like weir disposed at the remaining end of said plate and pivotal about a horizontal axis above said plate, and means for pivoting said weir about said horizontal axis.

28. A distillation process, comprising heating material to be distilled such that a portion thereof is in a vapor state; passing said material adjacently along a progressive series of vaporization stages and in heat exchange relationship therewith for successive, partial condensation of said material along said stages, thereby supplying the latent heat resulting from such condensation to said stages respectively; returning said material, countercurrent with respect to the passing thereof, through said stages for successive, partial vaporization along said stages; continuously discharging said material which remains unvaporized after such successive, partial vaporization as residue; and continuously recovering said material which is vaporized in said stages as products, and wherein said process includes the further step of removing such of said material as is vaporized after passage of said material adjacently along said vaporization stages and prior to return of the material through said vaporization stages.

29. The distillation process of claim 28 including the further step of rectifying the so removed, vaporized material and passing the reflux formed thereby also through said vaporization stages.

References Cited in the file of this patent

UNITED STATES PATENTS

| | | |
|---|---|---|
| 63,970 | Waters | Apr. 16, 1867 |
| 68,470 | Trageser et al. | Sept. 3, 1867 |
| 230,333 | Perlin et al. | July 20, 1880 |
| 631,461 | Guillaume | Aug. 22, 1899 |
| 1,400,851 | Backhaus | Dec. 20, 1921 |
| 1,466,221 | Foster et al. | Aug. 28, 1923 |
| 1,552,980 | Blaise | Sept. 8, 1925 |
| 1,568,157 | Hess | Jan. 5, 1926 |
| 2,085,522 | Baars | June 29, 1937 |
| 2,147,094 | Heckmann | Feb. 14, 1939 |
| 2,442,011 | Legatski | May 25, 1948 |
| 2,527,655 | Pyle et al. | Oct. 31, 1950 |
| 2,542,187 | Fulton | Feb. 20, 1951 |
| 2,543,001 | Dean | Feb. 27, 1951 |
| 2,578,670 | Carleton | Dec. 18, 1951 |
| 2,593,931 | Stearns | Apr. 22, 1952 |
| 2,645,467 | Rupp | July 14, 1953 |
| 2,759,800 | Hill | Aug. 21, 1956 |
| 2,759,882 | Worthen et al. | Aug. 21, 1956 |
| 2,804,427 | Suriano | Aug. 27, 1957 |
| 2,819,206 | Evans et al. | Jan. 7, 1958 |
| 2,862,698 | Howerton et al. | Dec. 2, 1958 |
| 2,868,645 | Neurether | Jan. 13, 1959 |
| 2,908,618 | Bethon | Oct. 13, 1959 |

FOREIGN PATENTS

| | | |
|---|---|---|
| 365,657 | Great Britain | Jan. 25, 1932 |
| 798,831 | France | Mar. 11, 1936 |
| 891,464 | France | Dec. 11, 1943 |
| 46,986 | Germany | Oct. 15, 1910 |
| 373,924 | Germany | Apr. 23, 1923 |

OTHER REFERENCES

Chemical Engineering, October 1956, pages 126 and 128, McGraw-Hill, N. Y.